United States Patent

Carabateas

[11] 3,922,278
[45] Nov. 25, 1975

[54] 4-(3-NITROPHENYL)-3,5-PYRIDINEDICARBOXYLIC ACID

[75] Inventor: Philip M. Carabateas, Schodack, N.Y.

[73] Assignee: Sterling Drug Inc., New York, N.Y.

[22] Filed: June 12, 1972

[21] Appl. No.: 262,001

[52] U.S. Cl....... 260/295.5 R; 424/258; 260/287 R; 260/290 R; 260/296 R; 260/295 R
[51] Int. Cl.²................................... C07D 213/55
[58] Field of Search.................... 260/290, 295.5

[56] References Cited
UNITED STATES PATENTS

| | | | |
|---|---|---|---|
| 3,441,648 | 4/1969 | Loev et al.................. | 260/295.5 |
| 3,485,847 | 12/1969 | Bossert et al................ | 260/295.5 |
| 3,647,807 | 5/1972 | Bossert et al................ | 260/195.5 |

OTHER PUBLICATIONS

Walker, Formaldehyde, (ACS Monograph Series) pp. 526, 536–537 (1964) (3rd Edition).
Ionescu et al., Bull Chim. Soc. Fr., Vol. 41, pp. 692–702 (1927).
Abstract of Netherlands patent 6414307, Chem. Abst., Vol. 64, Col. 713–714 (1966).
Huffmann et al., Chem. Abstracts, Vol. 57, Col. 828–829 (1962).
Klingsberg, Heterocyclic Compounds: Pyridine and Its Derivatives, part 3, p. 206 (1962).
Eisner et al., Chem. Rev. Vol. 72, pp. 1, 2, 6, 20. (Feb. 1972).

*Primary Examiner*—Harry I. Moatz
*Attorney, Agent, or Firm*—Robert K. Bair; B. Woodrow Wyatt

[57] ABSTRACT

4-(3-Nitrophenyl)pyridine, an intermediate useful in the preparation of 1-(lower-alkyl)-1,4-dihydro-4-oxo-7-(4-pyridyl)-3-quinolinecarboxylates, which are useful as antibacterial agents, is prepared by reacting 3-nitrobenzaldehyde with lower-alkyl propiolate to yield di-(lower-alkyl) 1,4-dihydro-4-(3-nitrophenyl)-3,5-pyridinedicarboxylate (III), oxidizing said 1,4-dihydro compound to produce di-(lower-alkyl 4-(3-nitrophenyl)-3,5-pyridinedicarboxylate (IV), hydrolyzing the latter compound to yield 4-(3-nitrophenyl)-3,5-pyridinedicarboxylic acid (V) and decarboxylating said dicarboxylic acid to produce 4-(3-nitrophenyl)pyridine. Intermediates III, IV and V are novel.

1 Claim, No Drawings

4-(3-NITROPHENYL)-3,5-PYRIDIMEDICARBOXYLIC ACID

This invention relates to the preparation of 4-(3-nitrophenyl)pyridine and to processes and intermediates used in its preparation.

4-(3-Nitrophenyl)pyridine is useful as an intermediate in the preparation of 1-(lower-alkyl)-1,4-dihydro-4-oxo-7-(4-pyridyl)-3-quinolinecarboxylates, which are useful as antibacterial agents which are disclosed and claimed in copending U.S. Pat. application Ser. No. 144,307 filed May 17, 1971 and now U.S. Pat. No. 3,753,993, issued Aug. 21, 1973.

The invention in a process aspect resides in the process of producing 4-(3-nitrophenyl)pyridine (VI) which comprises reacting 3-nitrobenzaldehyde (I) with lower-alkyl propiolate (II) to yield di-(lower-alkyl) 1,4-dihydro-4-(3-nitrophenyl)-3,5-pyridinedicarboxylate (III), oxidizing said 1,4-dihydro compound (III) to produce di-(lower-alkyl) 4-(3-nitrophenyl)-3,5-pyridinedicarboxylate (IV), hydrolyzing the latter compound (IV) to yield 4-(3-nitrophenyl)-3,5-pyridinedicarboxylic acid (V) and decarboxylating said dicarboxylic acid (V) to produce 4-(3-nitrophenyl)pyridine (VI). Other process aspects of the invention reside in each of the first, second, third and fourth steps of the above-described process and sub-combinations thereof.

The overall process of the invention is illustrated by the following flowsheet:

where R is lower-alkyl.

The invention in its composition aspect resides in the compounds of the Formulas III, IV and V, that is, di-(lower-alkyl) 1,4-dihydro-4-(3-nitrophenyl)-3,5-pyridinedicarboxylate, di-(lower-alkyl) 4-(3-nitrophenyl)-3,5-pyridinedicarboxylate and 4-(3-nitrophenyl)-3,5-pyridinedicarboxylic acid, respectively.

The term "lower-alkyl", as used herein, means alkyl radicals having from one to six carbon atoms, illustrated by methyl, ethyl, n-propyl, isopropyl, n-butyl, sec-butyl, isobutyl, n-amyl, n-hexyl and the like.

The intermediate compounds of the invention having the Formulas IV and V are useful in their free base form or in the form of their acid-addition salts, and both forms are within the purview of the invention, and are considered to be one and the same invention. The acid-addition salts are simply a more convenient form for use; and, in practice, use of the salt form inherently amounts to use of the base form. In practicing my invention, I found it convenient to employ the hydrochloride salt. However, other appropriately acceptable salts within the scope of the invention are those derived from mineral acids, such as hydrobromic acid, hydriodic acid, nitric acid, phosphoric acid, sulfamic acid and sulfuric acid; and organic acids, such as acetic acid, tartaric acid, methanesulfonic acid, ethanesulfonic acid, benzenesulfonic acid, and the like, giving the hydrobromide, hydriodide, nitrate, phosphate, sulfamate, sulfate, acetate, tartrate, methanesulfonate, ethanesulfonate and benzenesulfonate, respectively.

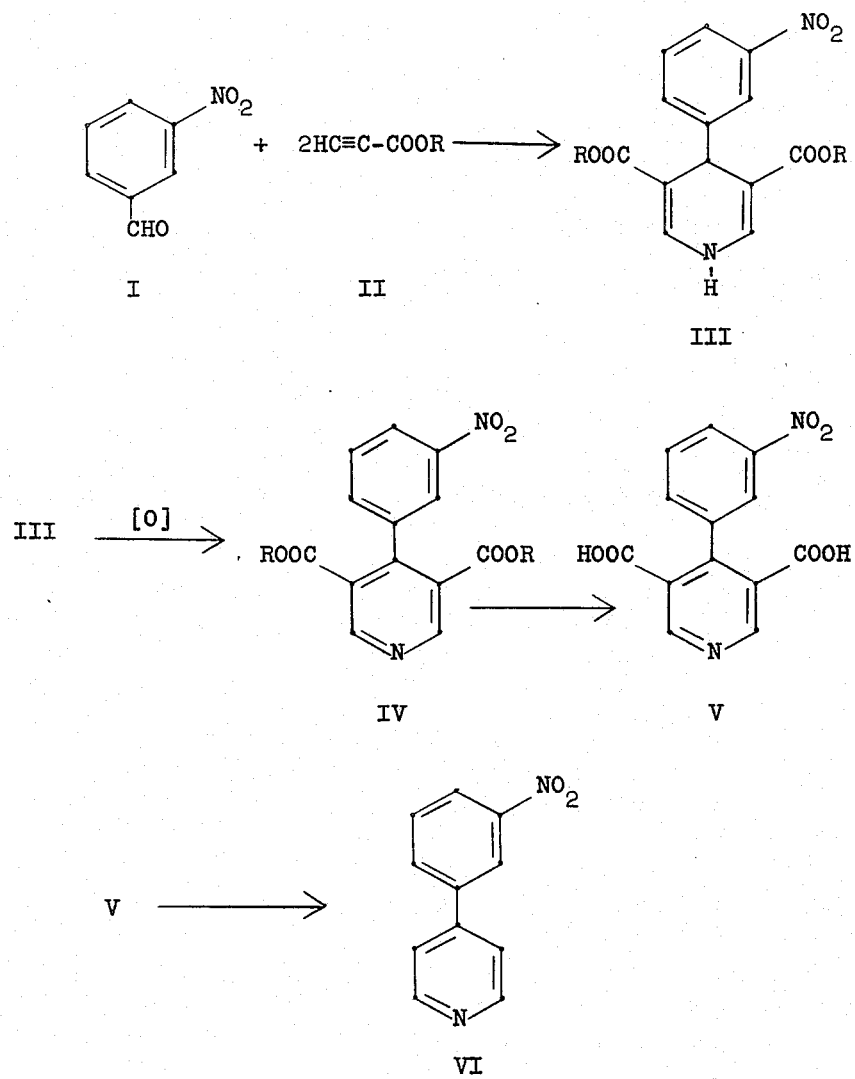

The acid-addition salts are prepared preferably by reacting the free base and acid in an organic solvent, e.g., ethanol, acetone, etc., in which the salt separates directly or can be obtained by concentration of the solution.

The molecular structures of said composition aspects of the invention were assigned on the basis of evidence provided by infrared, ultraviolet and nuclear magnetic resonance spectra, by chromatographic mobilities, and by the correspondence of calculated and found values for the elementary analysis for representative examples.

The manner of making and using the instant invention will now be generally described so as to enable a person skilled in the art of pharmaceutical chemistry to make and use the same, as follows:

The reaction of 3-nitrobenzaldehyde with lower-alkyl propiolate and ammonia to yield di-(lower-alkyl) 1,4-dihydro-4-(3-nitrophenyl)-3,5-pyridinedicarboxylate is carried out preferably by heating the reactants in the range of about 50° to 150°C., with a preferred range being about 75° to 125°C. The reaction is run preferably in refluxing acetic acid using ammonium acetate as the source of ammonia and using methyl or ethyl propiolate. Other sources of ammonia, e.g., ammonium propionate, or ammonia per se, can be used, as can other solvents in place of acetic acid, e.g., propionic acid, ethanol. The intermediate lower-alkyl propiolates are generally known and are either commercially available or prepared by conventional methods.

The oxidation of di-(lower-alkyl) 1,4-dihydro-4-(3-nitrophenyl)-3,5-pyridinedicarboxylate to yield di-(lower-alkyl)4-(3-nitrophenyl)-3,5-pyridinedicarboxylate is readily carried out using an appropriate oxidizing agent, preferably aqueous nitric acid because of its low cost, ready availability and ease of removal of any excess used. The aqueous nitric acid can contain from about 5 to 50% (by volume) of nitric acid, preferably from about 25–35%. The oxidation can be carried out from about room temperature (25°C.) to about 100°C., preferably from about 50° to 95°C. using aqueous nitric acid. Other oxidizing agents and solvents can be used, for example, sodium nitrite in acetic acid, chromium trioxide or sodium dichromate in acetic acid, oxides of nitrogen (nitrogen oxide or nitrogen dioxide), and the like. Alternatively, the reaction can be effected by dehydrogenating the 1,4-dihydro compound by heating it in the presence of a palladium-on-charcoal catalyst, the reaction temperature being in the range of about 100° to 200°C., preferably about 140° to 170°C. and preferably using an appropriate solvent, e.g., mineral oil, xylene, Dowtherm A.

The hydrolysis of di-(lower-alkyl) 4-(3-nitrophenyl)-3,5-pyridinedicarboxylate to yield 4-(3-nitrophenyl)-3,5-pyridinedicarboxylic acid is run either under acidic or alkaline conditions, preferably using aqueous hydrochloric acid because of its ready availability, low cost and ease of removal. The hydrolysis can be carried out from about room temperature (25°C.) to about 100°C. using where necessary an appropriate solvent, e.g., ethanol, methanol, acetone, and the like. Other aqueous acidic or alkaline solutions also can be used, e.g., aqueous hydrobromic acid, sulfuric acid, sodium hydroxide, potassium hydroxide, calcium hydroxide, and the like.

The decarboxylation of 4-(3-nitrophenyl)-3,5-pyridinedicarboxylic acid to produce 4-(3-nitrophenyl)pyridine is carried out by heating the dicarboxylic acid in the absence or presence of a suitable solvent in the range of about 125° to 300°C. The reaction is run preferably at about 225°–260°C. using as a solvent Dowtherm A (eutectic mixture of diphenyl and diphenyl ether), mineral oil, or other suitable solvent. The pyridinedicarboxylic acid can be used in free base form or as its acid-addition salt, e.g., hydrochloride, hydrobromide. Optionally, when the acid-addition salt, e.g., hydrochloride, is used, cuprous oxide is preferably used to take up the hydrogen chloride; alternatively, an acid-acceptor, e.g., potassium carbonate, sodium carbonate, etc., can be used.

The best mode contemplated for carrying out the invention is now set forth as follows:

1. Dimethyl 1,4-dihydro-4-(3-nitrophenyl)-3,5-pyridinedicarboxylate

To a stirred mixture containing 15.1 g. of 3-nitrobenzaldehyde and 16.8 g. of methyl propiolate was added with stirring 75 ml. of acetic acid and 10.0 g. of ammonium acetate. The resulting reaction mixture was refluxed for three hours and then concentrated in vacuo to yield a thick oily residue. The residue was washed with water whereupon it solidified. The solid was triturated with cold isopropyl acetate and then collected. The solid was boiled with about 40 ml. of isopropyl acetate, the mixture chilled and the solid collected. The solid was recrystallized from about 50 ml. of acetonitrile to yield 6.5 g. of dimethyl 1,4-dihydro-4-(3-nitrophenyl)-3,5-pyridinedicarboxylate, m.p. 185°–187°C.

Following the procedure described above in Example 1 but using in place of methyl propiolate the corresponding molar equivalent quantity of ethyl, n-propyl, isobutyl, n-amyl or n-hexyl propiolate, there is obtained diethyl, di-n-propyl, diisobutyl, di-n-amyl or di-n-hexyl 1,4-dihydro-4-(3-nitrophenyl)-3,5-pyridinedicarboxylate, respectively.

2. Dimethyl 4-(3-nitrophenyl)-3,5-pyridinedicarboxylate

To a mixture containing 20 ml. of water and 10 ml. of concentrated nitric acid was added 2.5 g. of dimethyl 1,4-dihydro-4-(3-nitrophenyl)-3,5-pyridinedicarboxylate and the resulting mixture was heated on a steam bath with stirring for fifteen minutes. The resulting solution was cooled, filtered and the filtrate made alkaline with ammonium hydroxide. The mixture was extracted several times with methylene dichloride. The extract was dried over anhydrous magnesium sulfate and the solvent removed in vacuo. The resulting white solid was recrystallized from methanol to yield dimethyl 4-(3-nitrophenyl)-3,5-pyridinedicarboxylate, m.p. 115°–116°C.

Following the procedure described in Example 2 but using in place of dimethyl 1,4-dihydro-4-(3-nitrophenyl)-3,5-pyridinedicarboxylate the corresponding molar equivalent quantity of diethyl, di-n-propyl, diisobutyl, di-n-amyl or di-n-hexyl 1,4-dihydro-4-(3-nitrophenyl)-3,5-pyridinedicarboxylate, there is obtained diethyl, di-n-propyl, diisobutyl, di-n-amyl or di-n-hexyl 4-(3-nitrophenyl)-3,5-pyridinedicarboxylate.

3. 4-(3-Nitrophenyl)-3,5-pyridinedicarboxylic acid

A solution containing 2.0 g. of potassium hydroxide pellets (85%), 25 ml. of water and 25 ml. of ethanol was added to 3.16 g. of dimethyl 4-(3-nitrophenyl)-3,5-pyridinedicarboxylate and the resulting mixture was refluxed with stirring for four hours. The reaction mixture was then concentrated in vacuo and the remaining solid was taken up in 15 ml. of water. The aqueous solution was made strongly acid with concentrated hydrochloric acid whereupon there separated a gum which solidified. The mixture was evaporated to dryness in vacuo and to the residue was added 20 ml. of water. The yellow solid was collected to yield 2.4 g. of 4-(3-nitrophenyl)-3,5-pyridinedicarboxylic acid as its hydrochloride, m.p. 269°–271°C. with decomposition.

4-(3-Nitrophenyl)-3,5-pyridinedicarboxylic acid was also prepared by hydrolyzing dimethyl 4-(3-nitrophenyl)-3,5-pyridinedicarboxylate using aqueous hydrochloric acid as follows: A mixture containing 3.16 g. of dimethyl 4-(3-nitrophenyl)-3,5-pyridinedicarboxylate, 20 ml. of water and 20 ml. of concentrated hydrochloric acid was refluxed with stirring for four hours. The reaction mixture was chilled (some solid product crystallized out) and then was concentrated in vacuo to leave, as a solid, 3.0 g. of 4-(3-nitrophenyl)-3,5-pyridinedicarboxylic acid as its hydrochloride, m.p. 252°–259°C.

4-(3-Nitrophenyl)-3,5-pyridinedicarboxylic acid is obtained following the procedures described in Example 3 but using in place of dimethyl 4-(3-nitrophenyl)-3,5-pyridinedicarboxylate the corresponding molar equivalent quantity of diethyl, di-n-propyl, diisobutyl, di-n-amyl or di-n-hexyl 4-(3-nitrophenyl)-3,5-pyridinedicarboxylate.

4. 4-(3-Nitrophenyl)pyridine

A mixture containing 2.3 g. of 4-(3-nitrophenyl)-3,5-pyridinedicarboxylic acid hydrochloride, 0.6 g. of cuprous oxide and 50 ml. of Dowtherm A was heated to boiling and then boiled with stirring for five minutes. The reaction mixture was cooled and then diluted with two volumes of methylene dichloride. The mixture was filtered and the filtrate was extracted three times with dilute hydrochloric acid. The combined acidic extracts were washed with methylene dichloride and then basified with ammonium hydroxide. The alkaline mixture was extracted twice with methylene dichloride. The resulting extract was dried over anhydrous magnesium sulfate and then evaporated to remove the solvent. The remaining crystalline product was recrystallized from isopropyl acetate to yield 1.1 g. of 4-(3-nitrophenyl)-pyridine, m.p. 111°–112°C.

Utilization of 4-(3-nitrophenyl)pyridine in the preparation of the antibacterially active 1-(lower-alkyl)-1,4-dihydro-4-oxo-7-(4-pyridyl)-3-quinolinecarboxylates is illustrated in the preparation of 1-ethyl-1,4-dihydro-4-oxo-7-(4-pyridyl)-3-quinolinecarboxylic acid, as given in the following Examples 5 through 8.

5. 4-(3-Aminophenyl)pyridine

A mixture containing 250 ml. of ethanol, 50 ml. of water, 13 ml. of acetic acid and 30.6 g. of iron powder was refluxed with stirring. The heat was removed and to the mixture was added in portions with stirring 35.0 g. of 4-(3-nitrophenyl)-pyridine at a rate causing the reaction mixture to reflux. After addition of the reactant had been completed, the reaction mixture was refluxed for an additional three hours. To the mixture was then added slowly 15 g. of solid sodium carbonate followed by infusorial earth. The resulting mixture was stirred for fifteen minutes and filtered while hot, washing the filtrate cake with hot ethanol. The combined filtrate and washings were concentrated in vacuo. The remaining solid was washed with water, collected and recrystallized from methanol-acetonitrile to yield 25.0 g. of 4-(3-aminophenyl)-pyridine, m.p. 162°–164°C.

6. Diethyl 3-(4-pyridyl)anilinomethylenemalonate

A mixture containing 25.0 g. of 4-(3-aminophenyl)-pyridine and 31.8 g. of diethyl ethoxymethylenemalonate was heated to 135°C. and held at that temperature for five minutes. Ethanol was evolved and the remaining material was diethyl 3-(4-pyridyl)anilinomethylenemalonate which was used directly in the following preparation (Example 7). In another run of this preparation (Example 6), a mixture containing 112 g. of 4-(3-aminophenyl)pyridine and 148 g. of diethyl ethoxymethylenemalonate was heated for eight minutes at 130°C., cooled to about 110°C. and 100 ml. of isopropyl alcohol added. The resulting solution was treated with cyclohexane until almost cloudy, treated with decolorizing charcoal, filtered and cooled. The solid that separated was collected to yield 205 g. of diethyl 3-(4-pyridyl)anilinomethylenemalonate, m.p. 86°–88°C.

7. Ethyl 1,4-dihydro-4-oxo-7-(4-pyridyl)-3-quinolinecarboxylate

Two 250 ml. portions of Dowtherm A (eutectic mixture of diphenyl and diphenyl ether) were heated to boiling. To each was added 25 g. of diethyl 3-(4-pyridyl)-anilinomethylenemalonate and boiling was continued for twelve minutes and the reaction mixture then allowed to cool. To each cooled mixture containing crystals was added an equivalent volume of n-hexane and the crystalline material was collected, combined and washed well with ether to yield 32.6 g. of ethyl 1,4-dihydro-4-oxo-7-(4-pyridyl)-3-quinolinecarboxylate, m.p. 242°–245°C. with decomposition.

8. 1-Ethyl-1,4-dihydro-4-oxo-7-(4-pyridyl)-3-quinolinecarboxylic acid

To a stirred suspension containing 5.1 g. of 57% sodium hydride dispersed in mineral oil and 150 ml. of dimethylformamide was added in portions 32.6 g. of ethyl 1,4-dihydro-4-oxo-7-(4-pyridyl)-3-quinolinecarboxylate [tautomeric with ethyl 4-hydroxy-7-(4-pyridyl)-3-quinolinecarboxylate] followed by the addition of 18.7 g. of ethyl iodide. The resulting reaction mixture was heated on a steam bath for three hours with stirring and then concentrated in vacuo to remove the solvent. The semi-solid residue was shaken well with a mixture of chloroform and water, and a small quantity of amorphous brown solid was filtered off. The layers were separated and the chloroform layer was evaporated in vacuo to remove the chloroform. To the oily residue containing ethyl 1-ethyl-1,4-dihydro-4-oxo-7-(4-pyridyl)-3-quinolinecarboxylate was added excess 10% aqueous sodium hydroxide solution and ethanol, and the solution was heated on a steam bath for 45 minutes to hydrolyze the ethyl ester to the corresponding carboxylic acid. The alkaline solution was diluted to a volume of about 500 ml. with water, decolorizing charcoal was added and the mixture filtered. The filtrate was neutralized with acetic acid whereupon the carboxylic acid separated as a solid. The solid was collected and dried in a rotary evaporator. The solid was boiled with ethanol, the solution chilled and the resulting solid collected. The solid was recrystallized from dimethylformamide (about 150 ml.) using decolorizing charcoal. The filtrate was chilled, diluted with about one-half volume of ethanol and the separated crystalline product was collected, recrystallized again from dimethylformamide and dried in vacuo to yield 4.3 g. of 1-ethyl-1,4-dihydro-4-oxo-7-(4-pyridyl)-3-quinolinecarboxylic acid, m.p. 272°–273°C. Further recrystallization of this compound from dimethylformamide raised its melting point to 290°C.

1-Ethyl-1,4-dihydro-4-oxo-7-(4-pyridyl)-3-quinolinecarboxylic acid and other 1-(lower-alkyl)-1,4-dihydro-4-oxo-7-(4-pyridyl)-3-quinolinecarboxylic acids, which are similarly prepared as above using the corresponding molar equivalent quantities of the appropriate lower-alkylating agent, when tested according to standard in vitro bacteriological evaluation procedures possess antibacterial activity, for example against organisms such as *Staphylococcus aureus*, *Pseudomonas aeruginosa*, *Klebsiella pneumoniae*, *Escherichia coli* and *Proteus vulgaris*, at concentrations in the range of about 0.01 to 250 mcg. per ml. Also, said compounds when tested according to standard in vivo bacteriological evaluation procedures in mice were found to have significant activity against bacteria, e.g., *Staphylococcus aureus*, *Escherichia coli* and *Klebsiella pneumoniae*, when administered orally and/or subcutaneously at dose levels in the range of about 3 to 200 mg. per kg. per day for 7 to 13 days.

The actual determination of the numerical antibacterial data definitive for a particular 1-(lower-alkyl)-1,4-dihydro-4-oxo-7-(4-pyridyl)-3-quinolinecarboxylic acid is readily obtained by known standard test procedures by technicians versed in antibacterial test procedures, without any need for any extensive experimentation.

The 1-(lower-alkyl)-1,4-dihydro-4-oxo-7-(4-pyridyl)-3-quinolinecarboxylic acids can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

I claim:

1. 4-(3-Nitrophenyl)-3,5-pyridinedicarboxylic acid.

* * * * *